United States Patent
Kelley

(10) Patent No.: US 6,494,251 B2
(45) Date of Patent: Dec. 17, 2002

(54) THERMODYNAMIC CYCLE USING HYDROSTATIC HEAD FOR COMPRESSION

(75) Inventor: Bruce T. Kelley, Kingwood, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 09/932,619

(22) Filed: Aug. 17, 2001

(65) Prior Publication Data

US 2002/0007644 A1 Jan. 24, 2002

Related U.S. Application Data

(62) Division of application No. 09/404,413, filed on Sep. 23, 1999, now Pat. No. 6,295,827.
(60) Provisional application No. 60/101,634, filed on Sep. 24, 1998.

(51) Int. Cl.⁷ .............................. F25D 23/12; F03G 7/00
(52) U.S. Cl. ........................... 165/45; 62/260; 60/641.2
(58) Field of Search ..................... 62/260, 115, 116, 62/498, 500; 165/45; 60/641.2, 641.4, 641.6, 641.7

(56) References Cited

U.S. PATENT DOCUMENTS

| | | | |
|---|---|---|---|
| 1,882,256 A | 10/1932 | Randel | |
| 3,857,244 A | 12/1974 | Faucette | 165/45 X |
| 3,995,429 A | * 12/1976 | Peters | 60/641.2 |
| 4,104,883 A | 8/1978 | Naef | 60/641 |
| 4,157,015 A | 6/1979 | Hosterman et al. | 62/115 |
| 4,201,060 A | * 5/1980 | Outmans | 62/641.2 |
| 4,251,998 A | 2/1981 | Hosterman et al. | 62/115 |
| 4,311,025 A | 1/1982 | Rice | 62/502 |
| 4,424,681 A | 1/1984 | Rice et al. | 62/114 |
| 4,805,415 A | 2/1989 | Van Rensburg et al. | 62/260 |
| 4,993,483 A | 2/1991 | Harris | 165/45 |
| 5,263,322 A | 11/1993 | Molini | 60/398 |
| 5,363,664 A | 11/1994 | Beakley et al. | 62/113 |
| 5,561,985 A | 10/1996 | Cochran | 62/260 |
| 5,706,888 A | 1/1998 | Ambs et al. | 165/45 X |

FOREIGN PATENT DOCUMENTS

| | | |
|---|---|---|
| EP | 66912 | 12/1982 |
| JP | 356102632 | 8/1981 |

* cited by examiner

Primary Examiner—Chen-Wen Jiang
(74) Attorney, Agent, or Firm—Gary D. Lawson

(57) ABSTRACT

A thermodynamic cycle is disclosed that uses compression and expansion to generate refrigeration or power in which at least some of the compression is effected by hydrostatic head of the heat-exchange medium used in the cycle. In a refrigeration cycle, the head of a heat-exchange medium in the refrigeration cycle is used to compress the heat-exchange medium. A vaporous heat-exchange medium is introduced into the upper end of a down riser that extends downwardly through a heat sink. The vaporous heat-exchange medium descends through the down riser and the head of the heat-exchange medium compresses the heat-exchange medium. The heat generated by the compression is transferred to the heat sink. The heat-exchange medium is then pumped up through a return riser and passed through a pressure expansion means and evaporator. From the evaporator the heat-exchange medium is returned to the upper end of the down riser for recycling.

5 Claims, 4 Drawing Sheets

THERMODYNAMIC CYCLE USING HYDROSTATIC HEAD FOR COMPRESSION

CROSS-REFERENCE TO CORRESPONDING APPLICATIONS

This application is a divisional of U.S. application Ser. No. 09/404,413, filed Sep. 23, 1999, now U.S. Pat. No. 6,295,827, and claims the benefit of U.S. Provisional Application No. 60/101634, filed Sep. 24, 1998.

FIELD OF THE INVENTION

The invention relates generally to an improved thermodynamic cycle in which a heat-exchange medium goes through a cyclic process of compression, condensation, and expansion to produce power or to produce cooling. More specifically, the invention relates to an improved thermodynamic cycle that uses hydrostatic head to effect compression.

BACKGROUND OF THE INVENTION

Thermodynamic power-producing cycles and refrigeration cycles use various cyclic combinations of compression, heat rejection, expansion, and heat addition. In these cycles, the cost of energy to effect compression is a significant part of the cycles' capital cost as well as the cycles' operating cost.

Common features of thermodynamic power-producing cycles include (1) a compression process wherein one or more compressors or pumps increase the pressure of a heat-exchange medium, (2) a thermal addition process in which energy is added to he heat-exchange medium from a suitable heat source such as air, water, or fossil fuel, 3) an expansion process during which work is done by the system on the surroundings, and (4) a rejection process in which thermal energy is transferred to the surroundings. In the process, thermal energy is converted into mechanical energy.

Refrigeration is used in the oil and gas industry to recover heavier hydrocarbons from produced fluids. This is desirable for various reasons, including hydrocarbon dewpoint conditioning and recovery of natural gas liquids (NGLs) that are more valuable as a liquid than as a gas. Refrigeration is also used in the production of liquefied natural gas (LNG). In the production of offshore oil and gas, the refrigeration is often on offshore structure where space is a premium. The refrigeration system typically requires equipment to compress, condense, and expand a heat-exchange medium to produce cooling. Having a compressor on an offshore structure takes up space and increases safety risks associated with having a mechanical apparatus using a pressurized heat-exchange medium which is often combustible. It would be desirable therefore to have a refrigeration system available for use in offshore operations without having a compressor on the surface facilities.

It would be beneficial from the standpoint of both initial and operating costs to eliminate the need for a conventional compressor in power-producing cycles and refrigeration cycles.

SUMMARY

The present invention is direct to a thermodynamic cycle that uses compression and expansion to generate refrigeration or power in which a substantial portion of the compression is effected by hydrostatic head of the heat-exchange medium used in the cycle.

In one embodiment, a refrigeration cycle uses the head of a heat-exchange medium in the refrigeration cycle to compress the heat-exchange medium. Vaporous heat-exchange medium is introduced into the upper end of a down riser or conduit that extends downwardly through a suitable heat sink. The vaporous heat-exchange medium descends through the down riser and the head of the heat-exchange medium compresses the heat-exchange medium. The heat generated by the compression of the heat-exchange medium in the down riser is transferred to the heat sink, which surrounds the down riser. Preferably, the heat-exchange medium leaves the bottom of the down riser in a liquid phase. The heat-exchange medium liquid is then pumped up through a return riser and passed through a pressure expansion means and evaporator. From the evaporator the heat-exchange medium is returned to the upper end of the down riser for recycling.

In this embodiment of the present invention eliminates the need for the mechanical compressor of a conventional refrigeration system. Compression and heat rejection phases of this refrigeration system are simultaneously performed in a down riser. A heat-exchange medium pump is the only moving part of the refrigeration system. Compression of the heat-exchange medium is virtually isothermal at the temperature of the heat sink.

In another embodiment of this invention, a thermodynamic power cycle uses hydrostatic compression to condense a heat-exchange medium. In this embodiment, a heat-exchange medium is compressed by downward flow in a gravitational field from an initial elevation to a second, lower elevation. Examples of suitable systems for achieving the elevation difference can comprise a wellbore or a conduit extending between the top and bottom of a body of water. At the lower elevation, the heat-exchange medium is pumped back to the initial, upper elevation. The heat-exchange medium is then heated, thereby at least partially vaporizing the heat-exchange medium. The heated heat-exchange medium is then passed through an expansion device, preferably one or more hydraulic turbines, to expand the heat-exchange medium to a lower pressure whereby energy is produced. From the expansion device the heat-exchange medium is preferably cooled by a heat exchanger before being recycled.

The present invention can substantially reduce the cost of compressing the gas to a liquid compared to the cost of an adiabatic process performed by a conventional compressor. One advantage of this invention over power cycles used in the past is that gravity is used to carry out a substantial portion of the compression of the heat-exchange medium.

BRIEF DESCRIPTION OF THE DRAWINGS

The present invention and its advantages will be better understood by referring to the following detailed description and the attached drawings.

The drawings present specific embodiments of practicing the process of this invention. The drawings are not intended to exclude from the scope of the invention other embodiments that are the result of normal and expected modifications of these specific embodiments. Various required subsystems such as valves, control systems, sensors, clamps, and riser support structures have been deleted from the drawings for the purposes of simplicity and clarity of presentation.

DETAILED DESCRIPTION OF THE PREFERRED EMBODIMENTS

This invention relates to an improved thermodynamic cycle in which a heat-exchange medium passes through a cyclic process of compression, condensation, and expansion in which a substantial portion of the compression is effected by hydrostatic head of the heat-exchange medium. This invention has application to any thermodynamic cycle that requires compression of a heat-exchange medium. It is particularly useful in power-producing cycles and in refrigeration cycles.

Figure 1:
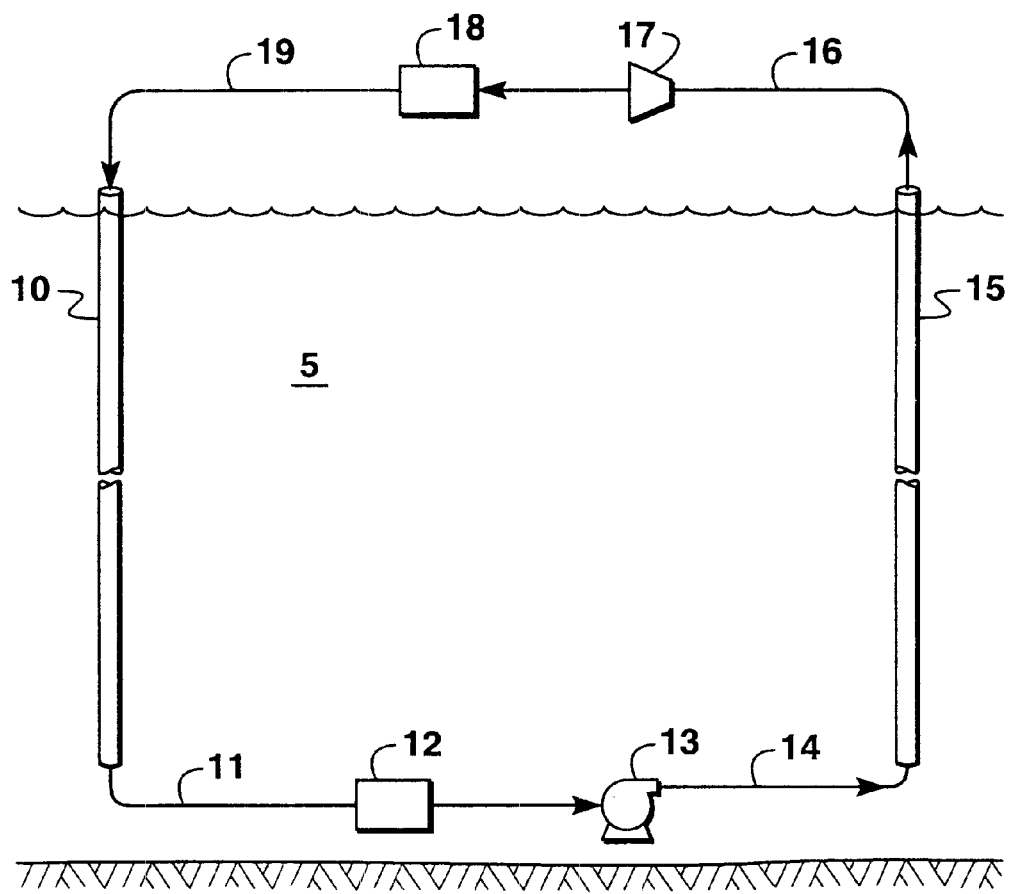
FIG. 1 is a schematic diagram of the refrigeration system of one embodiment of the present invention.

FIG. 1 shows a cyclic refrigeration system in accordance with the practice of this invention. A vaporous heat-exchange medium enters the upper end of a down riser 10 through line 19. The pressure of the heat-exchange medium in the down riser 10 increases as the heat-exchange medium descends the down riser. Heat is continuously transferred from the heat-exchange medium in the down riser 10 to a heat sink 5 that surrounds the down riser 10. From the bottom of the down riser 10 the heat-exchange medium may optionally be passed to a heat exchanger 12 to further cool the heat-exchange medium to ensure that essentially all of the heat-exchange medium is in a liquid phase. Heat exchanger 12 may be desirable in applications in which the length of the down riser is not sufficient to compress the heat-exchange medium to a liquid phase, or in applications in which more cooling is needed to complete the condensation of the heat-exchange medium.

The heat-exchange medium is then passed by line 11 to a conventional pump 13 which pumps the heat-exchange medium through line 14 and up a return riser 15. The top of the return riser is at approximately the same elevation as the top of the down riser 10. After exiting return riser 15, the heat-exchange medium is preferably expanded by a suitable expansion means 17, such as a conventional turboexpander or a Joule-Thomson valve, to lower the heat-exchange medium pressure and thereby further cool the heat-exchange medium. Heat-exchange medium is then conveyed (line 16) to a conventional evaporator 18, which functions to cool a process fluid (not shown in the FIGS.). The heat-exchange medium exits the evaporator 18 through line 19 in a substantially vaporous phase. The vaporous heat-exchange medium is then passed by line 19 to the upper end of the down riser 10 for recycling. The refrigeration provided by the heat exchange medium may be used in cryogenic natural gas processing which requires the use of refrigeration cycles to achieve process temperatures ranging from −3.9° C. (25° F.) to −193° C. (−315° F.) and colder. Non-limiting examples of such processes include cryogenic acid gas removal ($H_2S$, $CO_2$, COS, and $CS_2$), cryogenic $N_2$ removal, helium recovery, liquid petroleum gas (LPG) recovery, liquid natural gas (LNG) production, and pressurized liquid natural gas natural gas (PLNG) production.

The heat sink surrounding down riser 10 in the practice of this invention can be seawater, lake water, the earth, or ambient air. In the illustration of FIG. 1, the heat sink 5 is seawater. However, this invention is not limited to use in offshore applications. The down riser 10 may for example extend along the side of a mountain and into a valley, it may extend into the earth, or it may be attached to or be inside a tall building. The down riser 10 can be slanted and undulating. The down riser 10 in accordance with this invention can take any size or shape or orientation provided there is a significant difference in elevation between its upper and lower ends.

The elevation difference between the upper end of down riser 10 and its lower end is preferably sufficient to compress the heat-exchange medium to the saturation pressure of the heat-exchange medium at the temperature existing in the down riser at the lower end of the down riser. More preferably, the length of the down riser is sufficient to condense all of the vaporous liquid by using only the head of the heat-exchange medium in the down riser. The greater the elevation difference between the upper end and the lower end, the more hydrostatic head that can be obtained. As described in more detail below, the optimum elevation difference will depend on many factors, including for example the temperature of the heat sink, the flow rate of heat-exchange medium in the down riser 10, and the type of heat-exchange medium used.

For most heat-exchange mediums, this elevation difference will be at least 1,000 meters, and preferably more than 1,500 meters.

Continuing downward movement of the heat-exchange medium in the down riser 10 results in a pressure increase commensurate with depth or head of the heat-exchange medium at any given location. This increase in hydrostatic head assumes that frictional losses of heat-exchange medium flow in the down riser 10 are less than the hydrostatic head. Preferably, the frictional losses will be negligible compared to the hydrostatic head. The frictional forces of heat-exchange medium flowing in down riser 10 depend on the flow rate of the heat-exchange medium in the down riser and the volumetric space through which the heat-exchange medium can flow. To reduce the cost of installing the down riser 10, a smaller diameter conduit is desirable. However, the frictional forces increase with decreasing inside diameter of the down riser 10. The desired heat-exchange medium flow rate will depend on the refrigeration load expected and the efficiency of the overall refrigeration system. Those skilled in the art can determine a suitable size of down riser 10 to ensure that the frictional forces do not exceed the gravitational head forces, and preferably size the down riser 10 so that the frictional forces do not significantly affect the hydrostatic head.

Although only one down riser is shown in FIG. 1, it should be understood that a plurality of down risers may be used in the practice of this invention. In most cases, however, one suitably sized down riser will be more economical than a plurality of smaller down risers to handle the same heat-exchange medium flow.

Down riser 10 is preferably made of a material that has a high heat-exchange coefficient so that the temperature of the heat-exchange medium in the down riser has approximately the same temperature as the surrounding heat sink. Heat is continually transferred from the heat-exchange medium within the down riser to the heat sink. The temperature of the heat-exchange medium would rise unless the heat of compression can be transferred to a heat sink. As the heat-exchange medium descends through the down riser, the heat-exchange medium pressure increases approximately isothermally at the temperature of the heat sink. If seawater is the heat sink, the temperature of the seawater typically decreases with increasing depth. It is therefore possible for the temperature of the fluid exiting down riser 10 to be lower than the temperature of heat-exchange medium at the upper end of the down riser even though the refrigeration undergoes compression. Down riser 10 therefore functions both as a compressor and a long, single-tube heat exchanger. Compression and heat rejection are simultaneously performed in down riser 10.

From the lower end of down riser 10, the heat-exchange medium is passed to one or more pumps 13 which pump the heat-exchange medium to a pressure sufficient to return the heat-exchange medium through the return riser 15 to approximately the same elevation as the upper end of down riser with enough energy so that with pressure reduction in a conventional evaporator 18 the heat-exchange medium cools a process fluid (not shown). Preferably, at some location along the down riser 10, the hydrostatic head corresponds with a pressure just above saturation pressure for the heat-exchange medium at the there-existing temperature. More preferably, the entire heat-exchange medium is in a liquid phase as the heat-exchange medium exits the down riser 10. If the heat-exchange medium is a liquid, pump 13 can be a conventional single-phase pump. If the heat-exchange medium is both liquid and vapor, the pump may be a two-phase pump.

The present invention is capable of using any heat-exchange medium that vaporizes when absorbing heat and condenses under the influence of heat removal and pressure. Many heat-exchange mediums are possible. The heat-exchange medium for example may be propane, ammonia, and fluorocarbons, such as one of the family known as "Freon." The heat-exchange medium can be a single component or it may comprise a multi-component mixture of refrigerants having different boiling points. Preferably, the heat-exchange medium vaporizes at the top of the down riser 10 and becomes a liquid at the bottom of the down riser.

In still another embodiment of this invention, heat-exchange medium in line 14 is passed to an expansion means, such as a conventional expansion device (not shown in the FIGS.), such as a mechanical expander or throttling valve, or both, to expand the heat-exchange medium to the pressure of the evaporator 18 before the heat-exchange medium flows up the return riser 15. Since riser 15 is surrounded by a heat sink, preferably seawater, this embodiment would require that at least part of the return riser 15 be suitably insulated. Substantial cooling could be lost to the heat sink 5 if insulation is not provided.

Several advantages arise from using hydraulic refrigeration system of this invention rather than a conventional compression system. Because of the near isothermal compression in the down riser 10, less work is required to provide high-pressure liquid heat-exchange medium to the evaporator 18. In an offshore facility that treats oil and/or gas, the refrigeration cycle of this invention is more efficient than having all of the heat-exchange medium compression occurring on the offshore facility above the water's surface. By requiring less power than conventional refrigeration cycle, more product sales are available for marketing.

Figure 2:
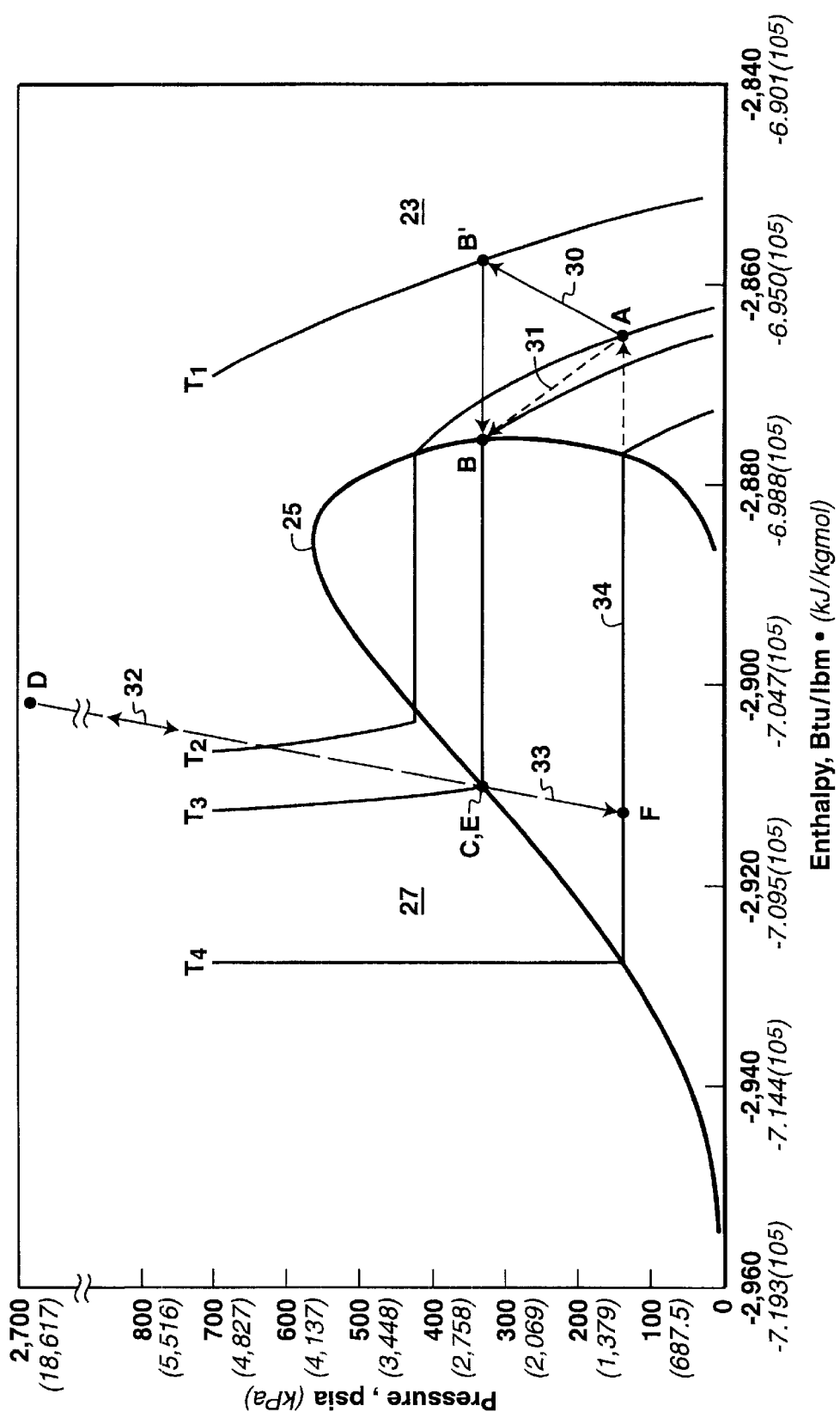
FIG. 2 is a pressure-enthalpy phase diagram representative of Freon 13 circulating in the process illustrated in FIG. 1.

FIG. 2 illustrates a pressure-enthalpy diagram which represents the enthalpy of the heat-exchange medium for the various components of the refrigeration cycle illustrated in FIG. 1. FIG. 2 is discussed in more detail below in connection with the description of the simulated example of the embodiment illustrated in FIG. 1.

Figure 3:
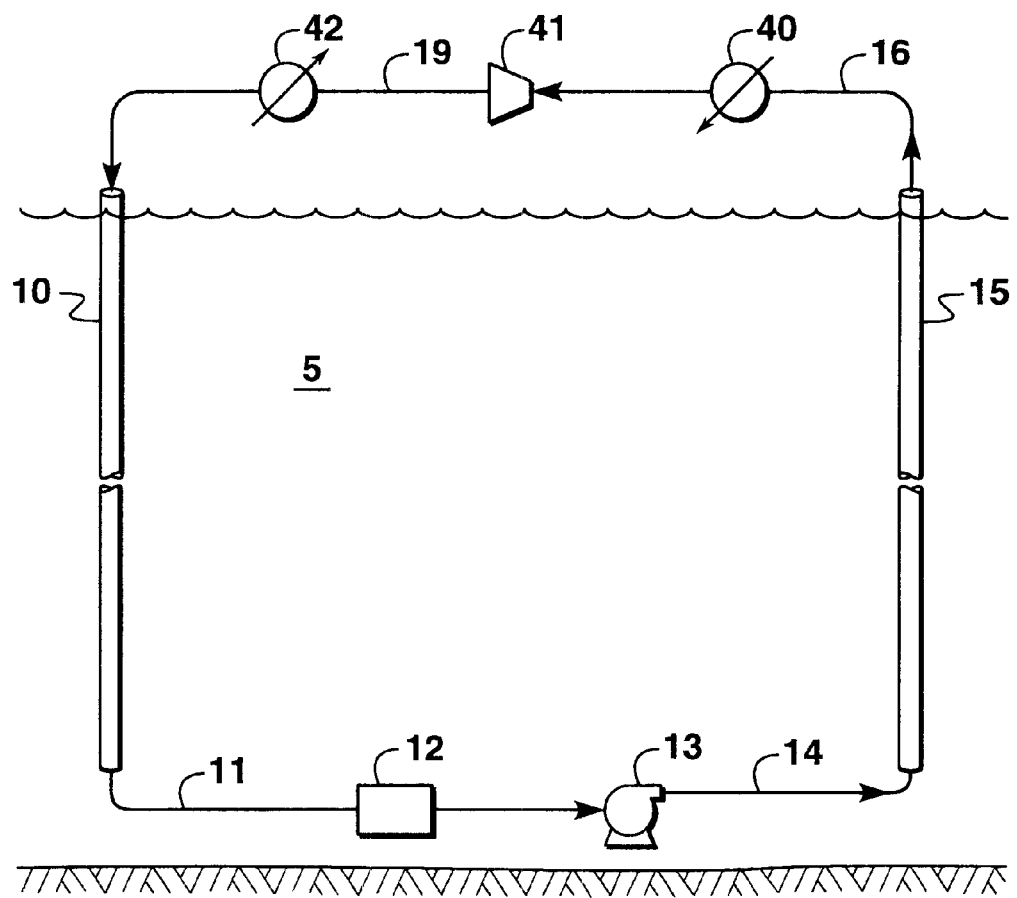
FIG. 3 is a schematic diagram of a thermodynamic power cycle, similar to the thermodynamic cycle of FIG. 1, for producing power instead of refrigeration.
Figure 4:
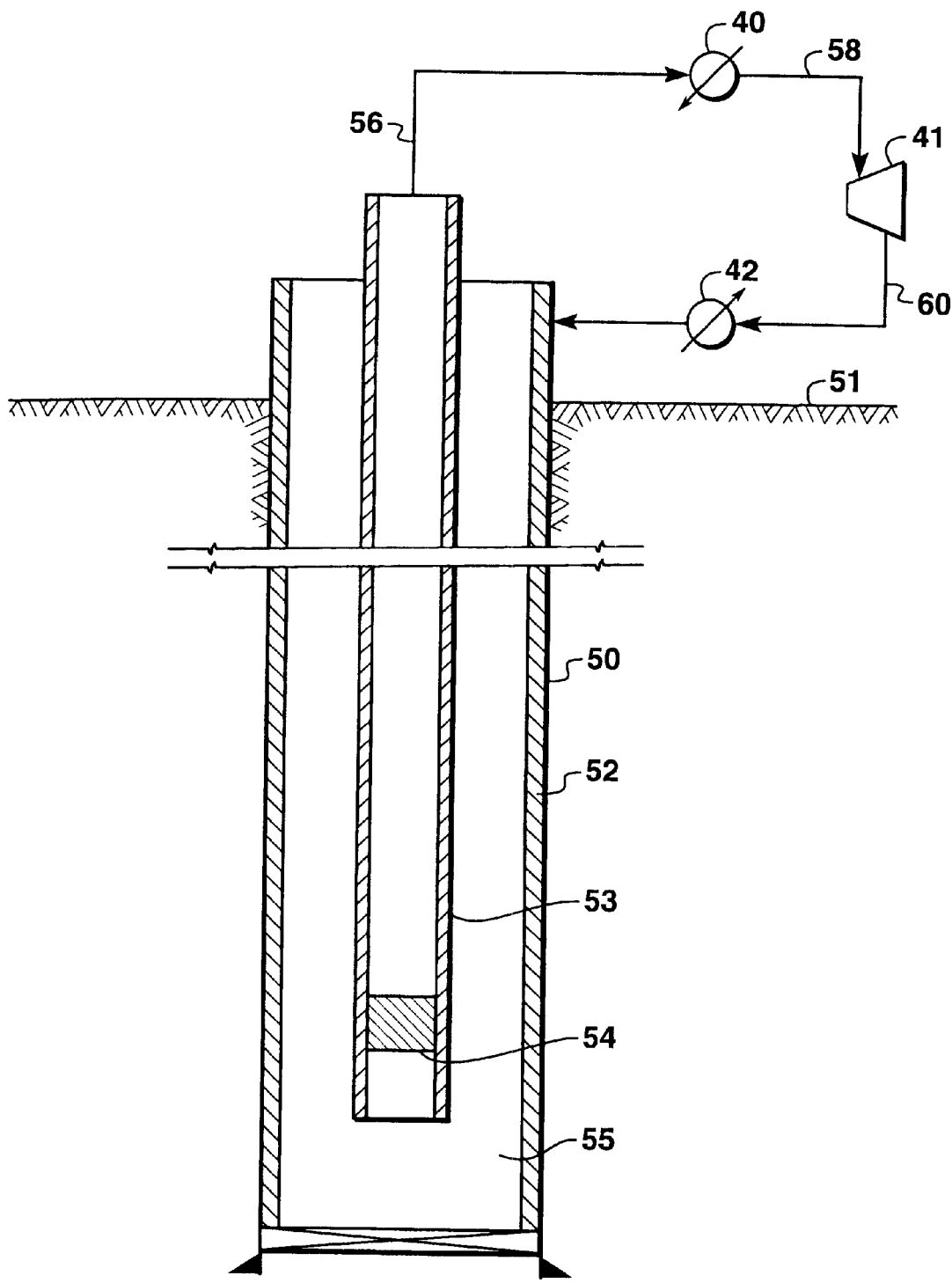
FIG. 4 is a schematic diagram of a thermodynamic power cycle in accordance with this invention in which heat-exchange medium is circulated and compressed in a well.

FIG. 3 illustrates another embodiment of this invention, and in this and the embodiments shown in FIG. 1 and FIG. 4, the parts having like numerals have the same process functions. Those skilled in the art will recognize, however, that the process equipment from one embodiment to another may vary in size and capacity to handle different fluid flow rates, temperatures, and compositions. Referring to FIG. 3, the thermodynamic cycle shown is similar to the refrigeration cycle of FIG. 1 except that the cycle in FIG. 3 produces power as the principal output instead of refrigeration. For the power cycle of FIG. 3, the pressure-enthalpy cycle will operate in reverse from the pressure-enthalpy cycle shown in FIG. 2.

In the embodiment shown in FIG. 3, a heat-exchange medium is passed by line 16 from the return riser 15 to a heat exchanger 40 wherein the heat-exchange medium is heated. Heat from any suitable source may be introduced to the heat exchanger 40, for example, waste hot water or steam. Heat exchanger 40 causes most or all of the heat-exchange medium to vaporize, so it leaves the heat exchanger 40 as a high vapor fraction gas. This gas is passed to a suitable work-expansion device 41. Device 41 is preferably a turbine, but it may be any other form of engine that operates by expansion of the vaporized heat-exchange medium. The heat-exchange medium is reduced in pressure by passage through the work-producing device 41 and the resulting energy may be recovered in any desired form, such as rotation of a turbine which can be used to drive electrical generators or to drive compressors.

The reduced-pressure heat-exchange medium may then be directed through line 19 back to the down riser 10 for recycling. Preferably, after exiting the work-producing device 41, the heat-exchange medium is cooled by a heat exchanger 42 which is cooled by any conventional cooling means using as a cooling medium ambient air, ground water, seawater, river water, or a heat-exchange medium of a closed-cycle refrigeration system. The desirability of using heat exchanger 42 will depend on the depth of the down riser 10 in seawater 5, the power desired for the system, and the type of heat-exchange medium. Operation of the other parts of the embodiment shown in FIG. 3 is the same as the operation of corresponding parts of FIG. 1 and therefore will not be discussed further. With the teachings of this description, the need for heat exchanger 42, the flow rate of the heat-exchange medium, and sizing of the equipment can be determined by those skilled in the art.

FIG. 4 illustrates still another embodiment of this invention. FIG. 4 shows a well 50 that extends from the surface of the earth 51 down to a depth of at least 1000 meters. The well 50 is lined with a suitable length of pipe or steel casing 52. A string of tubing 53 extends from the earth's surface to near the bottom of the well. A conventional downhole pump 54 is located within and near the bottom of tubing 53.

In the practice of this embodiment, a heat-exchange medium is introduced into the casing-tubing annular space 55. The heat-exchange medium flows down the annular space 55 and condenses as it flows down the annular space 55. At the bottom of the well 50, the heat-exchange medium is preferably predominantly, and more preferably entirely, in a liquid phase. The heat-exchange medium flows into pump 54, which may be a multiphase pump, where the heat-exchange medium is pumped through tubing 53 back to the earth's surface. From the top of tubing 53, the heat-exchange medium is passed by line 56 to a heat exchanger 40 wherein the heat-exchange medium is heated.

Heat from any suitable source is introduced to the heat exchanger 40, for example, waste hot water or steam. Heat exchanger 40 causes most or all of the heat-exchange medium to vaporize, so it leaves the heat exchanger 40 (stream 58) as a high vapor fraction gas. This gas is passed through line 58 to a suitable work-expansion device 41. Device 41 is preferably a turbine, but it may be any other form of engine that operates by expansion of the vaporized heat-exchange medium. The heat-exchange medium is reduced in pressure by passage through the work-producing device 41 and the resulting energy may be recovered in any desired form, such as rotation of a turbine which can be used to drive electrical generators or to drive compressors.

The reduced-pressure heat-exchange medium may then be directed through line 60 back to the casing-tubing annular space 55 for recycling. Preferably, after exiting the work-producing device 41, the heat-exchange medium is cooled by a heat exchanger 42 which is cooled by any conventional cooling means using as a cooling medium ambient air, ground water, seawater, river water, or a heat-exchange medium of a closed-cycle refrigeration system. The desirability of using heat exchanger 42 will depend on the depth of the well 50, the power desired for the system, and the type of heat-exchange medium. With the teaching of this description, the flow rate of the heat-exchange medium, and sizing of the equipment can be determined by those skilled in the art.

The heat-exchange medium for the embodiment illustrated in FIG. 4 may be any fluid that does not form solids in any of the flow conduits or equipment, and that in passage through heat exchanger 40 has a temperature above the freezing temperature of the heat source but below the actual temperature of the heat source. The heat-exchange medium is preferably predominantly, and more preferably entirely, in liquid form at the bottom of well 50. The heat-exchange medium preferably goes through at least partial phase changes during circulation through heat exchanger 40, with the resulting transfer of latent heat. The heat-exchange medium can be a pure compound or a mixture of compounds of such composition that the heat-exchange medium will condense over a range of temperatures. A non-limiting example of suitable heat-exchange media in the practice of this embodiment is a mixed heat-exchange fluid comprising 97% n-pentane, 2% i-pentane, and 1% hexane.

EXAMPLE

A simulated mass and energy balance was carried out to illustrate the preferred embodiment of the invention as described by FIG. 1, and the results are set forth in the Table below. The data in the Table assumed the heat-exchange medium was Freon (R-13) and that the evaporator temperature was about −26° C. (−15° F.). This corresponded to an evaporator pressure of about 945 kPa (137 psia). The down riser 10 was assumed to be 1524 meters from top to bottom. The pumping by pump 13 was assumed to be isentropic and the flow in the down riser 10 and the return riser 15 was assumed to be frictionless. In this example, a heat exchanger 12 was not used.

The data presented in the Table are offered to provide a better understanding of the present invention, but the invention is not to be construed as unnecessarily limited thereto. The temperatures and flow rates are not to be considered as limitations upon the invention which can have many variations in temperatures and flow rates in view of the teachings herein.

TABLE

| Stream | Phase Vapor/Liquid | Pressure kPa | Pressure psia | Temperature ° C. | Temperature ° F. |
|---|---|---|---|---|---|
| 11 | Liquid | 2,255 | 327 | 5.6 | 42 |
| 14 | Liquid | 18,389 | 2,667 | 28.9 | 84 |
| 16 | Vapor | 2,255 | 327 | 5.6 | 42 |
| 19 | Vapor | 945 | 137 | 15.6 | 60 |

Referring to FIG. 2, which illustrates a pressure-enthalpy diagram representing the enthalpy of the heat-exchange medium for the various components of the refrigeration cycle illustrated in FIG. 1, the refrigeration cycle represented by points ABCDEF is as follows:

Line 31 —a heat-exchange medium at point A in the vapor phase of region 23 enters the top of down riser 10 at temperature $T_2$(60° F./15.6° C.) and is compressed to a higher pressure (point B) during descent in down riser 10 and is further cooled, becoming liquid at point C, at a temperature of $T_3$(42° F./5.6° C.), which is the temperature of the seawater 5 in this example at the bottom of down riser 10.

Line 32—the liquid heat-exchange medium at temperature $T_3$ is pumped to pressure represented by point D, and is then passed through the return riser 15 to the surface of the seawater 5. The pressure of the liquid at the top of the return riser 15 is represented by point E, the same point on the pressure-enthalpy diagram as point C.

Line 33—the heat-exchange medium is isentropically expanded by an expansion means 17, such as a turboexpander, to lower the heat-exchange medium pressure to produce a vapor and liquid product (point F) at a lower pressure and a lower temperature $T_4$.

Line 34—heat exchange of the expanded heat-exchange medium in evaporator 18 heats the heat-exchange medium to temperature $T_2$(point A).

The power requirement of pump 13 in this simulated example was 6.43 Btu/lbm (1,563 kJ/kg mol), which represents the enthalpy difference between point C and point D of FIG. 2.

For purposes illustrating the thermodynamic efficiencies achievable in the practice of this invention, this simulated example was compared to a simulated refrigeration cycle that used a conventional compressor to pressurize the heat-exchange medium, using the same heat-exchange medium and the same operating conditions for evaporator 18 as described above for FIG. 1. It was assumed that a compressor adiabatically pressurized Freon (R-13) prior to passing the pressurized fluid to evaporator 18. The pump in this example required 7.83 Btu/lbm (1,902 kJ/kg mol) of energy, represented in FIG. 2 as movement from point A to point B'(line 30). The difference between the energy consumption of the compressor in this example (7.83 Btu/lbm or 1,902 kJ/kg mol) and power requirement of pump 13 (6.43 Btu/lbm or 1,563 kJ/kg mol) represents the energy efficiency of using hydrostatic head to isothermally compress the heat-exchange medium versus using a conventional compressor.

A person skilled in the art, particularly one having the benefit of the teachings of this patent, will recognize many modifications and variations to the specific process disclosed above. For example, any suitable support structure may be used to support down riser 10 and return riser 15, which can be selected by those skilled in the art depending on the environment in which the invention is practiced. Also, a variety of temperatures and pressures may be used in accordance with the invention, depending on the overall design of the system and the composition, temperature, and pressure of the liquefied natural gas. As discussed above, the specifically disclosed embodiments and examples should not be used to limit or restrict the scope of the invention, which is to be determined by the claims below and their equivalents.

What is claimed is:

1. A thermodynamic cycle wherein a heat-exchange medium passes through a cyclic process of compression, condensation, and expansion, which comprises effecting a substantial portion of such compression by hydrostatic head of the heat-exchange medium, said compression being effected without assistance of a non-heat-exchange medium and said hydrostatic head effecting liquefaction of a predominant portion of the heat-exchange medium.

2. A thermodynamic power cycle using a heat-exchange medium, comprising the steps of:
   (a) compressing the heat-exchange medium by causing the heat-exchange medium to flow downwardly in a gravitational field from a first elevation to a second, lower elevation, thereby effecting at least partial liquefaction of the heat-exchange medium, wherein the elevation difference between the first elevation and the second elevation is sufficient to effect liquefaction of a predominant portion of the heat-exchange medium at the second, lower elevation;
   (b) pumping the heat-exchange medium to the first elevation;
   (c) heating the heat-exchange medium to at least partially vaporize the heat-exchange medium; and
   (d) passing the heated heat-exchange medium through an expansion device to expand the heat-exchange medium whereby energy is produced and thereafter repeating the above steps in sequence.

3. The thermodynamic cycle of claim 2 further comprises, after expanding the heat-exchange medium in step (d), the additional step of cooling the expanded heat-exchange medium by a heat exchanger.

4. A thermodynamic power cycle using a heat-exchange medium circulated in a wellbore comprising a wellbore casing and tube contained therein thereby forming an annular space between the casing and tubing, comprising the steps of:
   (a) passing the heat-exchange medium down the annular space of the wellbore, the heat-exchange medium being at least partially liquefied at a lower elevation in the wellbore;
   (b) pumping the heat-exchange medium from the bottom of the tubing to the top of the wellbore;
   (c) heating the heat-exchange medium to at least partially vaporize the heat-exchange medium;
   (d) passing the heated heat-exchange medium through an expansion device to expand the heat-exchange medium whereby energy is produced; and
   (e) cooling the expanded heat-exchange medium by a heat exchanger, and thereafter repeating the above steps in sequence.

5. The thermodynamic power cycle of claim 4 in which the heat-exchange medium is n-pentane.

* * * * *